United States Patent
Sikka et al.

(10) Patent No.: US 11,238,631 B2
(45) Date of Patent: Feb. 1, 2022

(54) ALIGN-TO-GROUND, WEAKLY SUPERVISED PHRASE GROUNDING GUIDED BY IMAGE-CAPTION ALIGNMENT

(71) Applicant: SRI International, Menlo Park, CA (US)

(72) Inventors: Karan Sikka, Lawrenceville, NJ (US); Ajay Divakaran, Monmouth Junction, NJ (US); Samyak Datta, Atlanta, GA (US)

(73) Assignee: SRI International, Menlo Park, CA (US)

( * ) Notice: Subject to any disclaimer, the term of this patent is extended or adjusted under 35 U.S.C. 154(b) by 2 days.

(21) Appl. No.: 16/855,362

(22) Filed: Apr. 22, 2020

(65) Prior Publication Data
US 2021/0056742 A1    Feb. 25, 2021

Related U.S. Application Data

(60) Provisional application No. 62/888,722, filed on Aug. 19, 2019.

(51) Int. Cl.
*G06T 11/60*     (2006.01)
*G06F 16/56*     (2019.01)
*G06F 16/51*     (2019.01)

(52) U.S. Cl.
CPC .............. *G06T 11/60* (2013.01); *G06F 16/51* (2019.01); *G06F 16/56* (2019.01)

(58) Field of Classification Search
CPC ................................. G06N 20/00; G06N 3/08
See application file for complete search history.

(56) References Cited

U.S. PATENT DOCUMENTS

| 2016/0125274 A1* | 5/2016 | Zhou ........................ G06K 9/66 382/160 |
| 2017/0132526 A1* | 5/2017 | Cohen ..................... G06N 5/022 |

(Continued)

OTHER PUBLICATIONS

Datta, Samyak and Sikka, Karan and Roy, Anirban and Ahuja, Karuna and Parikh, Devi and Divakaran, Ajay; "Align2Ground: Weakly Supervised Phrase Grounding Guided by Image-Caption Alignment"; Proceedings of the IEEE/CVF International Conference on Computer Vision (ICCV); Oct. 2019. (Year: 2019).*

(Continued)

*Primary Examiner* — Phi Hoang
(74) *Attorney, Agent, or Firm* — Moser Taboada (57) ABSTRACT

A method, apparatus and system for visual grounding of a caption in an image include projecting at least two parsed phrases of the caption into a trained semantic embedding space, projecting extracted region proposals of the image into the trained semantic embedding space, aligning the extracted region proposals and the at least two parsed phrases, aggregating the aligned region proposals and the at least two parsed phrases to determine a caption-conditioned image representation and projecting the caption-conditioned image representation and the caption into a semantic embedding space to align the caption-conditioned image representation and the caption. The method, apparatus and system can further include a parser for parsing the caption into the at least two parsed phrases and a region proposal module for extracting the region proposals from the image.

19 Claims, 8 Drawing Sheets

(56) References Cited

U.S. PATENT DOCUMENTS

| | | | | |
|---|---|---|---|---|
| 2017/0200066 | A1* | 7/2017 | Wang | G06K 9/4604 |
| 2017/0235824 | A1* | 8/2017 | Liu | G06F 40/00 |
| | | | | 707/723 |
| 2018/0267996 | A1* | 9/2018 | Lin | G06K 9/4676 |
| 2018/0329892 | A1* | 11/2018 | Lubbers | G06K 9/6262 |
| 2019/0042880 | A1* | 2/2019 | Yeager | G06K 9/6256 |
| 2020/0193245 | A1* | 6/2020 | Divakaran | G06K 9/4609 |
| 2020/0349464 | A1* | 11/2020 | Lin | G06N 3/084 |
| 2020/0394434 | A1* | 12/2020 | Rao | G06K 9/3241 |

OTHER PUBLICATIONS

Lebret, Rémi and Pinheiro, Pedro H.O. and Collobert, Ronan; "Phrase-based Image Captioning"; CoRR, 2015. (Year: 2015).*

R. Collobert, J. Weston, L. Bottou, M. Karlen, K. Kavukcuoglu, and P. Kuksa. Natural language processing (almost) from scratch. Journal of Machine LearningResearch, 12(Aug):2493-2537, 2011.

P. Young, A. Lai, M. Hodosh, and J. Hockenmaier. From image descriptions to visual denotations: New similarity metrics for semantic inference over event descriptions. Transactions of the Association for Computational Linguistics, 2:67-78, 2014.

R. Kiros, R. Salakhutdinov, and R. S. Zemel. Unifying visual semantic embeddings with multimodal neural language models. arXiv preprint arXiv:1411.2539, 2014.

B. A. Plummer, L. Wang, C. M. Cervantes, J. C. Caicedo, J. Hockenmaier, and S. Lazebnik. Flickr30k entities: Collecting region-to-phrase correspondences for richer image-to sentence models. In International Conference on Computer Vision, pp. 2641-2649, 2015.

I. Vendrov, R. Kiros, S. Fidler, and R. Urtasun. Order-Embeddings of images and language. arXiv preprint arXiv:1511.06361, 2015.

L. Ma, Z. Lu, L. Shang, and H. Li. Multimodal convolutional neural networks for matching image and sentence. In International Conference on Computer Vision, pp. 2623-2631, 2015.

A. Rohrbach, M. Rohrbach, R. Hu, T. Darrell, and B. Schiele. Grounding of textual phrases in images by reconstruction. In European Conference on Computer Vision, pp. 817-834. Springer, 2016.

Y. Zhu, O. Groth, M. Bernstein, and L. Fei-Fei. Visual7w: Grounded question answering in images. In Conference on Computer Vision and Pattern Recognition, pp. 4995-5004, 2016.

A. Eisenschtat and L. Wolf. Linking image and text with 2-way nets. In Conference on Computer Vision and Pattern Recognition, 2017.

Y. Huang, W. Wang, and L. Wang. Instance-aware image and sentence matching with selective multimodal lstm. In Conference on Computer Vision and Pattern Recognition, p. 7, 2017.

K. Chen, J. Gao, and R. Nevatia. Knowledge aided consistency for weakly supervised phrase grounding. arXiv preprint arXiv:1803.03879, 2018.

K. Ahuja, K. Sikka, A. Roy, and A. Divakaran. Understanding visual ads by aligning symbols and objects using co-attention. arXiv preprint arXiv:1807.01448, 2018.

L. Wang, Y. Li, J. Huang, and S. Lazebnik. Learning two branch neural networks for image-text matching tasks. Transactions on Pattern Analysis and Machine Intelligence, 2018.

M. Engilberge, L. Chevallier, P. Pérez, and M. Cord. Finding beans in burgers: Deep semantic-visual embedding with localization. In Conference on Computer Vision and Pattern Recognition, pp. 3984-3993, 2018.

V. Cirik, T. Berg-Kirkpatrick, and L.-P. Morency. Using syntax to ground referring expressions in natural images. arXiv preprint arXiv:1805.10547, 2018.

* cited by examiner

|  |  | COCO ||||| Flicker30k |||||
|---|---|---|---|---|---|---|---|---|---|---|---|
|  |  | Caption-to-Image retrieval |||| Phrase | Caption-to-Image retrieval |||| Phrase |
|  |  | R@1 | R@5 | R@10 | Med r | Det. % | R@1 | R@5 | R@10 | Med r | Det. % |
| Global |  | 39.3 | 74.8 | 56.3 | 2 | 12.2 | 27.1 | 56.0 | 68.4 | 4 | 8.0 |
| Pooling-based (words) |  | 47.9 | 81.7 | 91.0 | 2 | 10.7 | 40.7 | 71.2 | 80.9 | 2 | 8.4 |
| Pooling-based (phrases) |  | 48.4 | 81.7 | 91.2 | 2 | 10.8 | 41.4 | 71.4 | 81.2 | 2 | 8.9 |
| Weakly Supervised 2-Stage Multimodal Matching Model |||||||||||
| permInv | max | 40.3 | 76.3 | 87.8 | 2 | 14.5 | 29.1 | 60.8 | 72.7 | 3 | 11.5 |
|  | topk | 56.6 | 84.9 | 92.8 | 1 | 14.7 | 49.7 | 74.8 | 83.3 | 2 | 11.2 |
|  | attention | 42.8 | 78.1 | 89.1 | 2 | 10.2 | 37.9 | 67.0 | 77.8 | 2 | 6.2 |
| sequence | max | 39.4 | 75.0 | 87.1 | 2 | 14.5 | 29.9 | 60.9 | 72.7 | 3 | 11.5 |
|  | topk | 58.4 | 86.1 | 93.5 | 1 | 14.5 | 47.9 | 75.6 | 83.5 | 2 | 11.3 |
|  | attention | 41.9 | 77.1 | 88.4 | 2 | 9.8 | 38.2 | 68.4 | 78.2 | 2 | 5.6 |
| permInv | max | 42.0 | 78.0 | 89.3 | 2 | 14.5 | 41.1 | 72.8 | 83.3 | 2 | 11.5 |
|  | topk | 56.2 | 85.2 | 95.9 | 1 | 14.5 | 46.9 | 73.9 | 82.4 | 2 | 11.1 |
|  | attention | 41.6 | 77.2 | 88.5 | 2 | 10.5 | 44.6 | 74.4 | 84.7 | 2 | 7.0 |
| sequence | max | 57.0 | 86.6 | 94.6 | 1 | 14.4 | 30.9 | 63.2 | 74.9 | 3 | 11.1 |
|  | topk | 55.8 | 87.2 | 94.1 | 1 | 14.3 | 44.5 | 76.5 | 85.5 | 2 | 11.3 |
|  | attention | 45.2 | 79.0 | 89.6 | 2 | 7.7 | 46.1 | 76.6 | 85.5 | 2 | 7.7 |

ALIGN-TO-GROUND, WEAKLY SUPERVISED PHRASE GROUNDING GUIDED BY IMAGE-CAPTION ALIGNMENT

CROSS-REFERENCE TO RELATED APPLICATIONS

This application claims benefit of and priority to U.S. provisional patent application Ser. No. 62/888,722, filed Aug. 19, 2019, which is herein incorporated by reference in its entirety.

GOVERNMENT RIGHTS

This invention was made with Government support under Contract W81XWH-17-C-0083 awarded by the Department of Defense. The Government has certain rights in the invention.

FIELD

Embodiments of the present principles generally relate to evaluating a performance of a portfolio of projects, and more particularly, to methods, apparatuses, and systems for portfolio performance prediction.

BACKGROUND

A problem in the area of vision and language evaluation is visual grounding of, for example, free-form textual phrases, which focuses on localizing natural language descriptions in images. Grounding freeform, natural language phrases in visual data is challenging as it requires joint reasoning about both modalities as well as large scale, annotated training data.

Current supervised learning approaches for addressing visual grounding include significant manual efforts in collecting annotations for region-phrase correspondence. For example, some recent techniques have approached the problem of visual grounding by collecting fully annotated datasets of region-phrase correspondences and learning a similarity metric for matching them. However, such techniques require a collection of fine-grained annotations, which is a labor-intensive process.

SUMMARY

Embodiments of methods, apparatuses and systems for visual grounding of, for example, free-form textual phrases of captions in images are disclosed herein.

In some embodiments in accordance with the present principles, a method for visual grounding of a caption in an image includes projecting at least two parsed phrases of the caption into a trained semantic embedding space, projecting extracted region proposals of the image into the trained semantic embedding space, aligning the extracted region proposals and the at least two parsed phrases, aggregating the aligned region proposals and the at least two parsed phrases to determine a caption-conditioned image representation and projecting the caption-conditioned image representation and the caption into a semantic embedding space to align the caption-conditioned image representation and the caption.

In some embodiments in accordance with the present principles, the method can further include parsing the caption into the at least two parsed phrases and extracting the region proposals from the image.

In some embodiments in accordance with the present principles, in the method for visual grounding of a caption in an image, the extracted region proposals and the at least two parsed phrases are aligned by determining a semantic similarity between the projected extracted region proposals and the projected at least two parsed phrases in the trained semantic embedding space. In some embodiments in accordance with the present principles, the semantic similarity is determined using a distance function, such as at least one of a cosine function, a Euclidean function and/or an L1 function, and the like.

In some embodiments in accordance with the present principles, in the method for visual grounding of a caption in an image, the aligned region proposals and the at least two parsed phrases are aggregated using at least one of a permutation-invariant set-encoder using a two-layer multi-layer perceptron (MLP), a recurrent neural network (RNN) such as a long-short term memory (LSTM), a convolutional neural network (CNN) and graphs.

In some embodiments in accordance with the present principles, in the method for visual grounding of a caption in an image, the embedded caption-conditioned image representation and the embedded caption are aligned in the semantic embedding space by computing a distance function, such as a cosine function, a Euclidean function and/or an L1 function between the projected caption-conditioned image representation and the projected caption.

In some embodiments in accordance with the present principles, in the method for visual grounding of a caption in an image, the projecting of at least two parsed phrases of the caption into a trained semantic embedding space includes determining a word vector representation of each of the at least two parsed phrases and projecting the word vector representation of each of the at least two parsed phrases into the trained semantic embedding space such that vector representations that are related are closer together in the trained semantic embedding space than unrelated vectors.

In some embodiments in accordance with the present principles, in the method for visual grounding of a caption in an image, the projecting of extracted region proposals of the image into the trained semantic embedding space includes extracting appearance features of each of each of the extracted region proposals, determining a feature vector representation of each of the extracted region proposals, and projecting the feature vector representation of each of the extracted region proposals into the trained semantic embedding space such that vector representations that are related are closer together in the trained semantic embedding space than unrelated vectors.

In some embodiments in accordance with the present principles, a method of creating a trained semantic embedding space for use for visual grounding of a caption in an image includes for each image region of a plurality of images having known respective phrases, extracting semantic appearance features, determining a feature vector representation for the extracted features of each of the image regions, determining a word vector representation for the respective phrases of each of the image regions, and for each of the image regions, semantically embedding the feature vector representation and the word vector representation for the respective phrases of each of the image regions in a semantic embedding space such that embedded feature vector representations and word vector representations that are related are closer together in the semantic embedding space than unrelated vectors.

In some embodiments in accordance with the present principles, in the method for creating a trained semantic embedding space for use for visual grounding of a caption in an image, the semantic embedding space is created using a loss function.

In some embodiments in accordance with the present principles, in the method for creating a trained semantic embedding space for use for visual grounding of a caption in an image, the plurality of images having known respective phrases include images from at least one of a COCO dataset, a Flick30k dataset, and a Visual Genome dataset.

In some embodiments in accordance with the present principles, an apparatus for visual grounding of a caption in an image includes a local matching module to project at least two parsed phrases of the caption and extracted region proposals of the image into a trained semantic embedding space and for aligning the extracted region proposals and the at least two parsed phrases, a local aggregator module to aggregate the aligned region proposals and the at least two parsed phrases to determine a caption-conditioned image representation, and a global matching module to project the caption-conditioned image representation and the caption into a semantic embedding space to align the caption-conditioned image representation and the caption.

In some embodiments in accordance with the present principles, the apparatus for visual grounding of a caption in an image further includes a parsing module to parse the caption into the at least two parsed phrases.

In some embodiments in accordance with the present principles, the apparatus for visual grounding of a caption in an image further includes a region proposal module to extract the region proposals from the image.

In some embodiments in accordance with the present principles, in the apparatus for visual grounding of a caption in an image, the local aggregator module aggregates the aligned region proposals and the at least two parsed phrases using at least one of a permutation-invariant set-encoder using a two-layer multilayer perceptron (MLP), a recurrent neural network (RNN) such as a long-short term memory (LSTM), a convolutional neural network (CNN) and graphs.

In some embodiments in accordance with the present principles, in the apparatus for visual grounding of a caption in an image, the global matching module aligns the embedded caption-conditioned image representation and the embedded caption by computing a distance function, such as at least one of a cosine function, a Euclidean function and/or an L1 function, and the like, between the projected caption-conditioned image representation and the projected caption.

In some embodiments in accordance with the present principles, in the apparatus for visual grounding of a caption in an image, the local matching module projects the at least two parsed phrases of the caption into a trained semantic embedding space by determining a word vector representation of each of the at least two parsed phrases, and projecting the word vector representation of each of the at least two parsed phrases into the trained semantic embedding space such that vector representations that are related are closer together in the trained semantic embedding space than unrelated vectors.

In some embodiments in accordance with the present principles, in the apparatus for visual grounding of a caption in an image, the local matching module projects the extracted region proposals of the image into the trained semantic embedding space by extracting appearance features of each of each of the extracted region proposals, determining a feature vector representation of each of the extracted region proposals, and projecting the feature vector representation of each of the extracted region proposals into the trained semantic embedding space such that vector representations that are related are closer together in the trained semantic embedding space than unrelated vectors.

In some embodiments in accordance with the present principles, the apparatus for visual grounding of a caption in an image is further configured to create a trained semantic embedding space for use for visual grounding of a caption in an image, where the creating a trained semantic embedding space includes, for each image region of a plurality of images having known respective phrases, extracting semantic appearance features, determining a feature vector representation for the extracted features of each of the image regions, determining a word vector representation for the respective phrases of each of the image regions, and for each of the image regions, semantically embedding the feature vector representation and the word vector representation for the respective phrases of each of the image regions in a semantic embedding space such that embedded feature vector representations and word vector representations that are related are closer together in the semantic embedding space than unrelated vectors.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relating to methods, apparatuses and systems for visual grounding of phrases are disclosed herein. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to particular embedding and feature detection techniques implemented for grounding of free-form textual phrases, such teachings should not be considered limiting. Embodiments in accordance with the present principles can be implemented using other embedding and feature detection techniques for grounding of substantially any words and/or phrases within the concepts of the present principles.

Embodiments in accordance with the present principles provide methods, apparatuses and systems for visual grounding of textual phrases. In some embodiments in accordance with the present principles, weak supervision is used from image-caption pairs to provide visual grounding of textual phrases. That is, in some embodiments, the inventors provide a novel end-to-end solution (e.g. algorithm) that uses caption-to-image retrieval as a downstream task to guide a region-phrase matching task. For example, in some embodiments a method includes inferring a correspondence between regions of interest (ROIs) and phrases in a query caption, creating a discriminative image representation using the matched ROIs and phrases, and aligning the discriminative image representation with the caption.

More specifically, in some embodiments words representative of RoIs of images and text of phrases of captions are embedded in a semantic space such that the distances between the words in the semantic space follow semantic relationships between the words representative of the RoIs of the images and the text of the phrases. The embedded relationships of the semantic space are then used to determine a matching-conditioned image which enables the weak supervision to effectively guide a visual grounding task. That is, the described solution in accordance with embodiments of the present principles addresses the visual grounding problem by creating an intermediate representation to associate a global labeling to a local area labeling. The intermediate representation forces the global labeling to guide the individual parts of the caption towards a corresponding location, thus enabling the local association of phrases despite an absence of phrase annotation.

Figure 1:
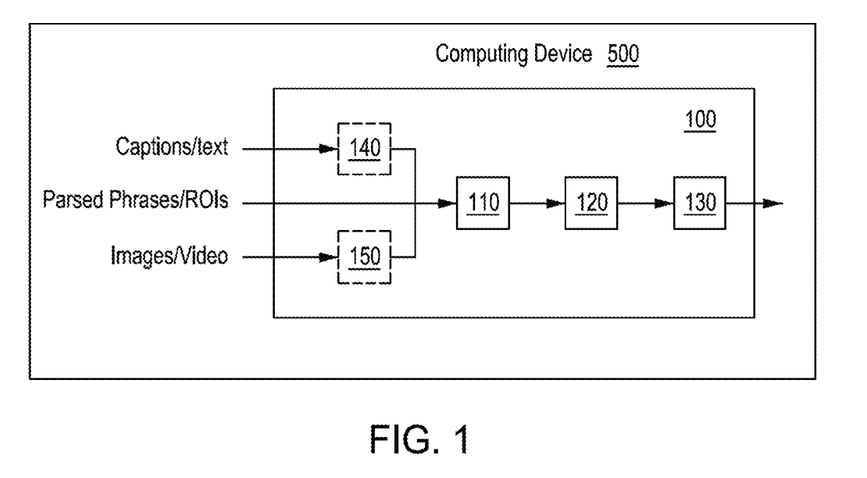
FIG. 1 depicts a high-level block diagram of a visual grounding system in accordance with an embodiment of the present principles.

FIG. 1 depicts a high-level block diagram of a visual grounding system 100 in accordance with an embodiment of the present principles. The visual grounding system 100 of FIG. 1 illustratively comprises a local matching module 110, a local aggregator module 120, and global matching module 130. As depicted in the visual grounding system 100 of FIG. 1, in some embodiments a visual grounding system in accordance with the present principles can further include an optional parsing module 140 and/or an optional region proposal module 150.

As depicted in FIG. 1, embodiments of a visual grounding system in accordance with the present principles, such as the visual grounding system 100 of FIG. 1, can be implemented in a computing device 500 (described in greater detail in FIG. 5) in accordance with the present principles. That is, in some embodiments, images and text that can be used to train a semantic space in accordance with the present principles and query captions to be processed can be received by the visual grounding system 100 from the computing device 500 using any input means associated with the computing device 500. Results of the portfolio performance prediction in accordance with the present principles can be presented to a user using an output device of the computing device 500, such as a display, a printer or any other form of output device.

Figure 2:
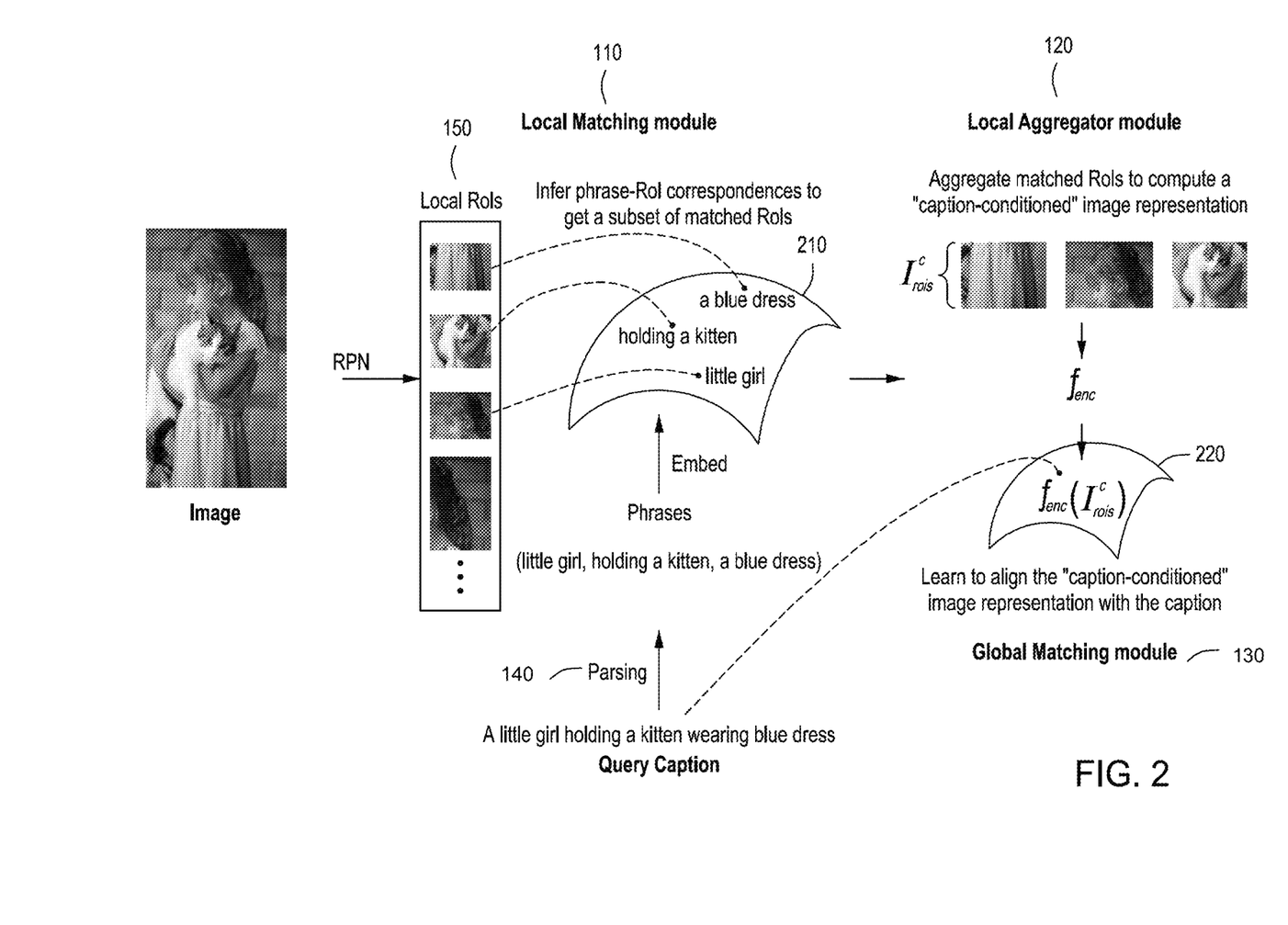
FIG. 2 depicts a graphical representation of the proposed architecture and overall functionality of a visual grounding system, such as the visual grounding system of FIG. 1, in accordance with an embodiment of the present principles.

FIG. 2 depicts a graphical representation 200 of the proposed architecture and overall functionality of a visual grounding system, such as the visual grounding system 100 of FIG. 1, in accordance with an embodiment of the present principles. For example, as depicted in the embodiment of FIG. 2, a query caption is received, for example, from a user of the computing device 500, in some embodiments by the optional parsing module 140 depicted in FIG. 1. At least one parsing function can be performed on the received caption. For example, in some embodiments, the parsing module 140 of FIG. 1 performs shallow parsing (also known as chunking) to parse the query caption into its constituent phrases. Shallow parsing of sentences first identifies the constituent parts (such as nouns, verbs) of a sentence and then combines the constituent parts into higher-order structures (such as noun-phrases and verb-phrases) that have a semantic meaning.

For example, in the embodiment of FIG. 2, the received phrase "A little girl holding a kitten wearing a blue dress" is parsed by the optional parsing module 140 into the three phrases "little girl", "holding a kitten", and "a blue dress". In some embodiments, additional post-processing can be performed based on some hand-crafted heuristics. For example, in some embodiments, rules can be defined that, for example, couple pre-occurring adjectives with nouns that follow, and couple verbs with objects of the verbs, and the like, to ensure proper parsing of phrases to get the final set of phrases from the query caption.

The parsed phrases can then be encoded using a neural network. For example, in some embodiments in accordance with the present principles, the phrases can be encoded using a 2-layer, bi-directional Gated Recurrent Unit neural network with a hidden layer of size 1024.

As depicted in FIG. 2, an image is received, for example, from a user of the computing device 500, in some embodiments by the optional region proposal module 150 depicted in FIG. 1. Region proposals (RoIs) are extracted from the image. In some embodiments, the region proposal module 150 extracts region proposals for the image by using a convolutional neural network (CNN). For example, in some embodiments, the region proposal module 150 applies a Faster-RCNN trained on both objects and attributes of a dataset, such as one of COCO, Flick30k, Visual Genome, and ImageNet. In some embodiments, for every image, a top number of RoIs (e.g., 30) are selected based on Faster-RCNN's class detection score (after non-maximal suppression and thresholding), then RoIAlign is used to extract the features ($dv=2048-d$) for each of the RoIs using a ResNet-152 model pre-trained on a dataset, such as the ImageNet dataset. For example, in the embodiment of FIG. 2, the optional region proposal module 150 extracts a plurality of region proposals for the received image including at least an image region depicting a blue dress, an image region depicting a kitten being held, and an image region depicting a little girl.

The parsed phrases from, for example the optional parsing module 140 and the RoI information, from, for example the optional region proposal module 150, are communicated to the local matching module 110. Alternatively or in addition, in some embodiments in accordance with the present principles, parsed phrase information and RoI information can be communicated to the local matching module 150 from a user of the computing device 500.

The local matching module 110 infers latent correspondences between RoIs in the image and phrases from the query caption. For example, as depicted in the embodiment of FIG. 2, the RoIs and the phrases are embedded in a joint embedding space 210 to determine a semantic similarity between the ROIs and the phrases. For example, in some embodiments, a geometric space, such as a semantic embedding space, can be built by embedding a plurality of words (i.e., representative of the proposed RoIs and the parsed phrases) into the semantic embedding space. That is, respective word vectors for the words representative of the proposed RoIs and the parsed phrases can be created and embedded into the semantic embedding space. In some embodiments, the semantic embedding space can be built using pre-trained word embedding models such as GloVe or fastText. Alternatively or in addition, in some embodiments in accordance with the present principles, to avoid a sparse sampling of the sematic embedding space during training, additional data from external sources can be implemented to train the semantic embedding space to produce a dense object class sampling in the semantic embedding space. In some embodiments, datasets such as the Microsoft common objects in context (COCO) dataset, which consists of 123,287 images with 5 captions per image, the Flick30k dataset, which consists of 31,783 images with 5 captions per image, the VisualGenome dataset, which can be used to evaluate phrase localization and can be used as a subset of images that contains images that are present in both a validation set of COCO and Visual Genome and consists of 17,359 images with 860,021 phrases, and the like, can be used by the local matching module 110 for training a semantic embedding space in accordance with the present principles.

The training/embedding in accordance with embodiments of the present principles described herein creates a common semantic embedding space that aligns object features of proposed RoIs with parsed phrases. In such embodiments, to align the RoIs and the phrases in the trained joint embedding space, each RoI, $x_j$, is projected into the same space as the phrase embeddings, $p_k$, via a linear projection. A semantic similarity, $S_{jk}$, between the RoI,$x_j$, and the phrase, $p_k$, is determined using distance function, such as at least one of a cosine function, a Euclidean function and/or an L1 function, and the like, in accordance with equations one (1) and two (2), which follow:

$$\hat{x}_j = W_l^T x_j \quad (1)$$

$$s_{jk} = \frac{\hat{x}_j^T p_k}{\|\hat{x}_j\|_2 \|p_k\|_2} \quad (2)$$

where $W_l \in \mathbb{R}^{d_v \times d_s}$ is the projection matrix.

In some embodiments, a matching variant referred to as max is implemented for inferring a matched RoI for each phrase. In such embodiments, a highest scoring instance is used as the matched sample. The max variant aligns a phrase, $p_k$, with its maximum matching RoI, $x_j^*$, i.e., $j^* = \mathrm{argmax}_j s_{jk}$. $j^* = \arg\max s_{jk}$.

Alternatively or in addition, in some embodiments a matching variant referred to as topk is implemented for inferring a matched RoI for each phrase. In such embodiments one of the top k (e.g., k=3) matching RoI candidates is randomly selected as a match to a phrase.

Alternatively or in addition, in some embodiments a matching variant inspired from recent advances in neural attention first computes attention weights, $\alpha_{jk}$, for each RoI for a given phrase and then generates an attended region vector (linear combination of RoI embeddings, weighted by the attention weights) according to equation three (3), which follows:

$$\alpha_{jk} = \mathrm{softmax}(s_{jk})_{j=1}^R x_k^c = \Sigma_j \alpha_{jk} x_j. \quad (3)$$

In accordance with the present principles, the use of any of the above matching variants determines a list of aligned RoIs/phrase pairs, $I_{rois}^c = (x_k^c)_{k=1}^P$, where $x_k^c$ is the feature vector for the aligned RoI for the phrase, $p_k$, in a query caption, c.

Referring back to FIG. 1 and FIG. 2, the local aggregator module 120 uses the RoIs and phrases matched (i.e., aligned) by the local matching module 110 to generate a caption-conditioned representation of the image. That is, in accordance with the present principles, the local aggregator module 120 aggregates the aligned RoIs and respective phrases to determine a caption-conditioned image representation. For example and as depicted in FIG. 2, the local aggregator module 120 aligns the image region depicting a blue dress, the image region depicting a kitten being held, and the image region depicting a little girl with the phrases "a blue dress", "holding a kitten", and "little girl". In accordance with the present principles, the image representation is conditioned on the query caption for which a similarity is to be later measured.

In some embodiments, the local aggregator module 120 implements an order-invariant encoding of the RoIs, denoted as $f_{permInv}$. In one such embodiment, a permutation-invariant set-encoder using a two-layer multilayer perceptron (MLP) is implemented to determine a caption-conditioned representation for the image (aligned-aggregated RoIs/phrases).

Alternatively or in addition, in some embodiments the local aggregator module 120 implements an order-dependent encoding of the RoIs, denoted as $f_{order}$. In such embodiments, a bi-directional RNN, such as Gated Recurrent Units (GRU), is implemented to encode the sequence of aligned RoIs and a last hidden state is used as the caption-conditioned representation for the image (aligned-aggregated RoIs). Order-dependent encoding is explored by making use of the observation that the phrases occur in a specific order in the query captions.

The caption-conditioned image representation (encoding of the aligned-aggregated RoIs and respective phrases) can then be communicated to the global matching module 130. For the remainder of the document, $f_{enc}$ will be used to represent the encoding function for both $f_{permInv}$ and $f_{order}$.

The global matching module 130 receives the caption-conditioned image encoding from the local aggregator module 120 and aligns the caption-conditioned image encoding with the query caption to create a model for grounding captions/phrases with images. That is, in some embodiments and as depicted in FIG. 2, the caption-conditioned image is embedded in a same embedding space 220 as the query caption, c, to align the caption-conditioned image to the query caption, c. In some embodiments, the caption-conditioned image is embedded in a same embedding space as the query caption, c, by using a two-layer Multilayer Perceptron (MLP). In some embodiments, the global matching module 130 then computes a similarity between the two modalities in accordance with equations four (4) and two (5), which follow:

$$\hat{c} = MLP(\Phi_{RNN}(c)) \quad \hat{r}_c = f_{enc}(I_{rois}^c) \quad (4)$$

$$S_{Ic} = \frac{\hat{c}^T \hat{r}_c}{\|\hat{c}\|_2 \|\hat{r}_c\|_2} \quad (5)$$

where $S_{Ic}$ is the similarity between the image, I, and the caption, c.

The embedding space 220 is trained to ground a caption with a caption-conditioned image as described above. That is, in some embodiments, the embedding space is trained with a bi-directional, max-margin ranking loss that enforces the score between an image (or caption) and its matching caption (or image) to be higher than a caption (or image) from another image (or caption) and vice-versa. In such embodiments, the hardest negatives in the mini-batch are sampled while generating triplets for the ranking loss according to equation six (6), which follows:

$$\mathcal{L} = \max_{c' \notin C_I} [0, m - S_{Ic} + S_{Ic'}]_+ + \max_{I' \notin \mathbb{I}_c} [0, m - S_{Ic} + S_{I'c}]_+ \quad (6)$$

Where $[a]_+ = \max(a,0) \; \forall a, m$ is the margin, $\mathbb{C}_I$ is the set of captions paired with image, I, and $\mathbb{I}_c$ is the set of images paired with caption, c.

Figure 3:
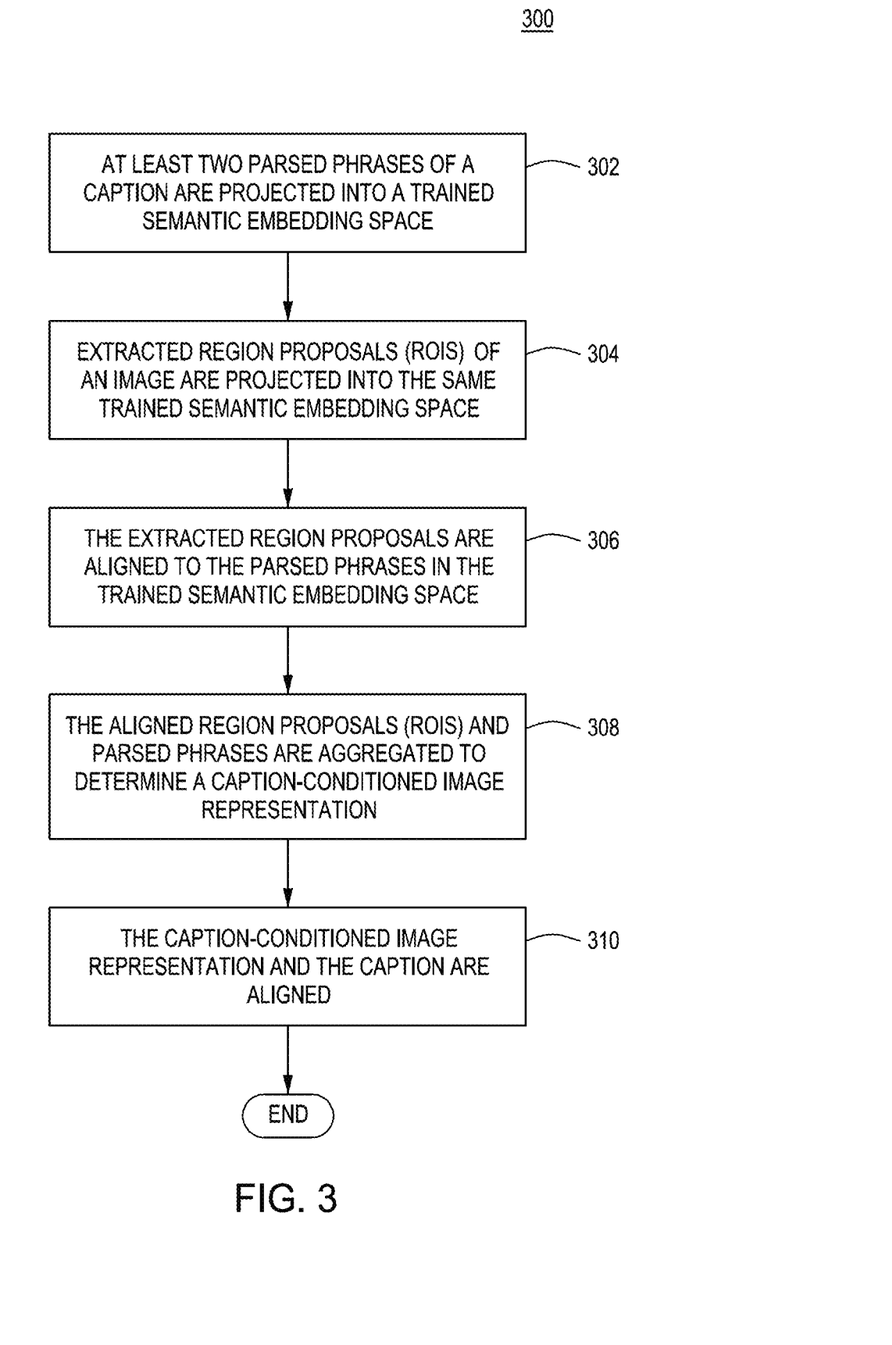
FIG. 3 depicts a table of the performance of a visual localization system in accordance with an embodiment of the present principles.

FIG. 3 depicts a flow diagram of a method 300 for visual grounding of text/phrases in accordance with an embodiment of the present principles. The method 300 can begin at 302 during which at least two parsed phrases of a caption are projected into a trained semantic embedding space. For example and as described above, in some embodiments a local matching module in accordance with the present principles can receive parsed phrases of a caption from a user of a computing device and, alternatively or in addition, from an optional parsing module in accordance with the present principles. The parsed phrases are projected into the trained semantic embedding space (described with respect to FIG. 4). The method 300 can proceed to 304.

At 304, extracted region proposals (RoIs) of an image are projected into the same trained semantic embedding space into which the at least two parsed phrases were projected. For example and as described above, in some embodiments a local matching module in accordance with the present principles can receive extracted region proposals (RoIs) of an image from a user of a computing device and, alternatively or in addition, from an optional region proposal module in accordance with the present principles. The extracted region proposals (RoIs) are projected into a trained semantic embedding space (described with respect to FIG. 4). The received The method 300 can proceed to 306.

At 306, the extracted region proposals are aligned to the parsed phrases in the trained semantic embedding space. For example and as described above, in some embodiments, to align the extracted region proposals to the parsed phrases a semantic similarity between the protected, extracted region proposals (ROIs) and the projected parsed phrases is determined by, for example a local matching module of the present principles, using a distance function, such as at least one of a cosine function, a Euclidean function and/or an L1 function, and the like. The method 300 can proceed to 308.

At 308, the aligned region proposals (ROIs) and parsed phrases are aggregated to determine a caption-conditioned image representation. For example and as described above, in some embodiments a permutation-invariant set-encoder using a two-layer multilayer perceptron (MLP) is implemented by, for example a local aggregator module of the present principles, to determine a caption-conditioned representation for the image (aligned-aggregated RoIs/phrases). In other embodiments, at least one of a recurrent neural network (RNN) such as a long-short term memory (LSTM), a convolutional neural network (CNN) and graphs can be implanted to determine a caption-conditioned representation for the image (aligned-aggregated RoIs/phrases). The method 300 can proceed to 310.

At 310, the caption-conditioned image representation and the caption are aligned. For example and as described above, in some embodiments the caption-conditioned image representation is embedded in a same embedding space as the query caption, c, by for example a global matching module of the present principles, to align the caption-conditioned image to the query caption, c. In some embodiments the alignment is determined by computing a similarity between the embedded, caption-conditioned image representation and the embedded caption. The method 300 can then be exited.

In some embodiments in accordance with the present principles, the method 300 can optionally further include at least one of parsing a query caption into its constituent phrases and extracting region proposals (RoIs) for an image. For example and as described above, in some embodiments an optional parsing module of the present principles receives a query caption and performs shallow parsing to parse the query caption into its constituent phrases. In addition and as described above, in some embodiments an optional region proposal module extracts region proposals (RoIs) for the image by using a convolutional neural network (CNN).

Figure 4:
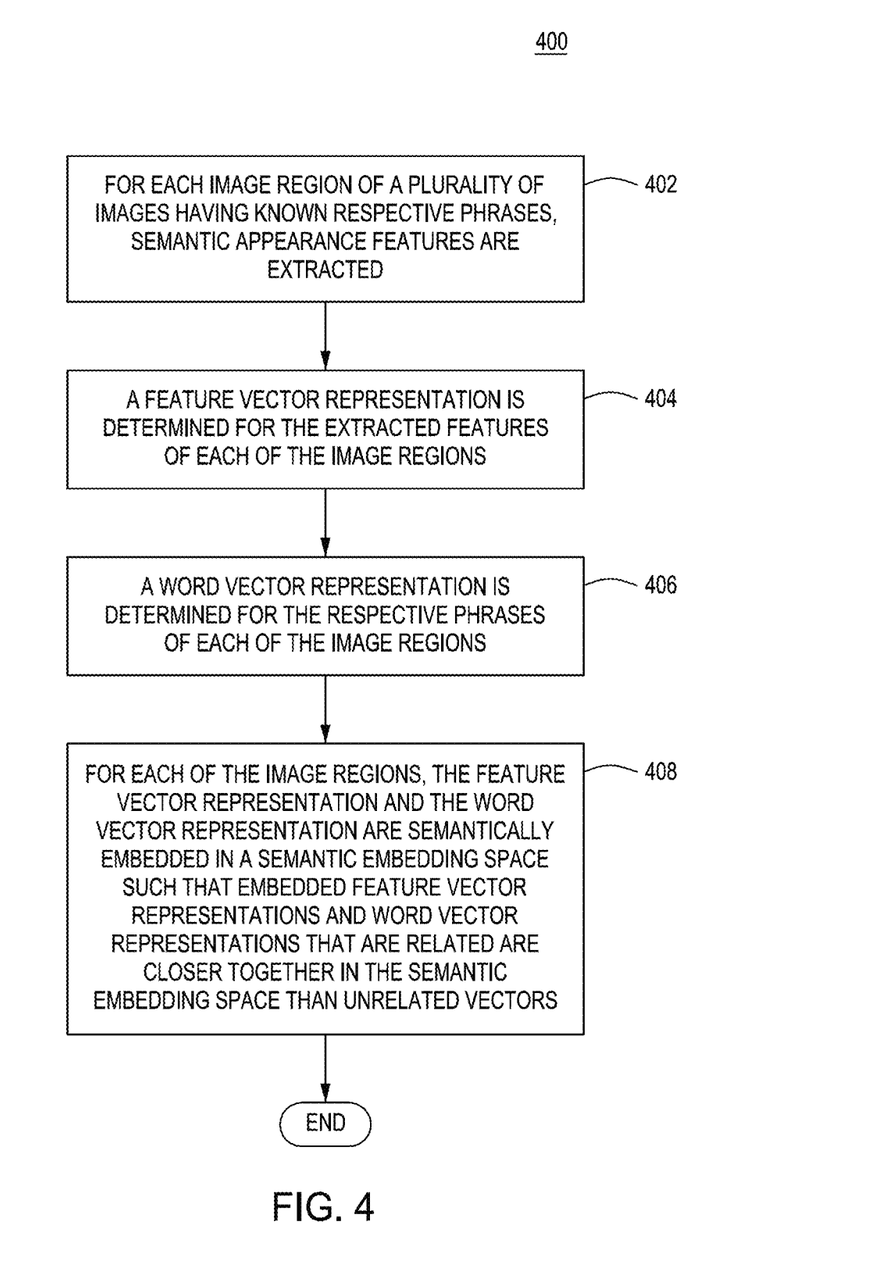
FIG. 4 depicts retrieval images for image searches for two cases with significant variations in viewing conditions in accordance with an embodiment of the present principles.

FIG. 4 depicts a flow diagram of a method 400 for creating a semantic embedding space for align extracted region proposals of an image to parsed phrases of a caption in accordance with an embodiment of the present principles. The method 400 begins at 402 during which, for each image region of a plurality of images having known respective phrases, semantic appearance features are extracted. The method 400 can proceed to 404.

At 404, a feature vector representation is determined for the extracted features of each of the image regions. The method 400 can proceed to 406.

At 406, a word vector representation is determined for the respective phrases of each of the image regions. The method 400 can proceed to 408.

At 408, for each of the image regions, the feature vector representation and the word vector representation for the respective phrases of each of the image regions are semantically embedded in a semantic embedding space such that embedded feature vector representations and word vector representations that are related are closer together in the semantic embedding space than unrelated vectors. The method 400 can be exited.

Figure 5:
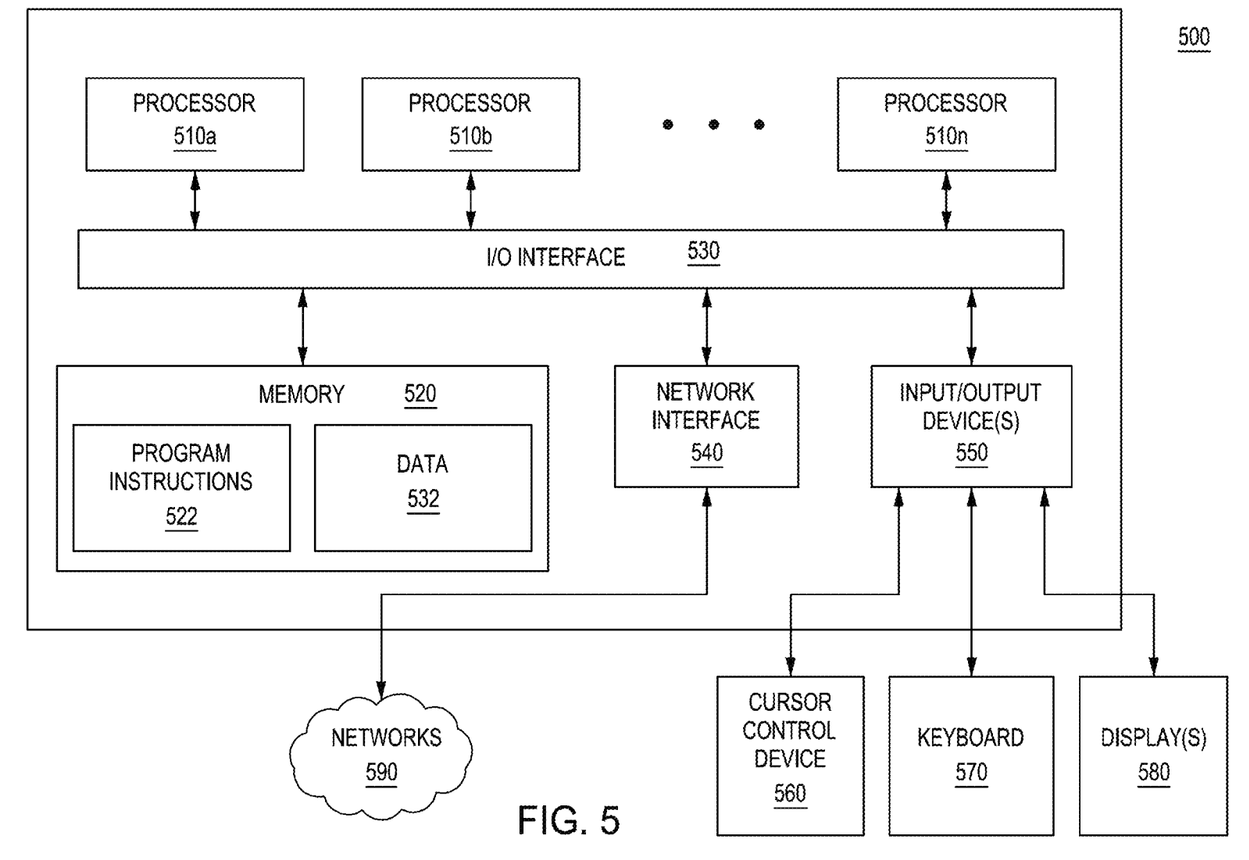
FIG. 5 depicts a high-level block diagram of a computing device suitable for implementing embodiments of a visual grounding system in accordance with embodiments of the present principles.

FIG. 5 depicts a high-level block diagram of a computing device 500 suitable for implementing embodiments of a visual grounding system in accordance with embodiments of the present principles. In some embodiments computing device 500 can be configured to implement methods of the present principles, such as at least the methods 300 and 400 as processor-executable executable program instructions 522 (e.g., program instructions executable by processor(s) 510) in various embodiments.

In the embodiment of FIG. 5, computing device 500 includes one or more processors 510*a*-510*n* coupled to a system memory 520 via an input/output (I/O) interface 530. Computing device 500 further includes a network interface 540 coupled to I/O interface 530, and one or more input/output devices 550, such as cursor control device 560, keyboard 570, and display(s) 580. In various embodiments, any of the components can be utilized by the system to receive user input described above. In various embodiments, a user interface can be generated and displayed on display 580. In some cases, it is contemplated that embodiments can be implemented using a single instance of computing device 500, while in other embodiments multiple such systems, or multiple nodes making up computing device 500, can be configured to host different portions or instances of various embodiments. For example, in one embodiment some elements can be implemented via one or more nodes of computing device 500 that are distinct from those nodes implementing other elements. In another example, multiple nodes may implement computing device 500 in a distributed manner.

In different embodiments, computing device 500 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computing device 500 can be a uniprocessor system including one processor 510, or a multiprocessor system including several processors 510 (e.g., two, four, eight, or another suitable number). Processors 510 can be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 520. In other embodiments, program instructions and/or data can be received, sent or stored upon different types of computer-accessible media or on similar media separate from system memory 520 or computing device 500.

In one embodiment, I/O interface 530 can be configured to coordinate I/O traffic between processor 510, system memory 520, and any peripheral devices in the device, including network interface 540 or other peripheral interfaces, such as input/output devices 550. In some embodiments, I/O interface 530 can perform any necessary protocol, timing or other data transformations to convert data signals from one component (e.g., system memory 520) into a format suitable for use by another component (e.g., processor 510). In some embodiments, I/O interface 530 can include support for devices attached through various types of peripheral buses, such as a variant of the Peripheral Component Interconnect (PCI) bus standard or the Universal Serial Bus (USB) standard, for example. In some embodiments, the function of I/O interface 530 can be split into two or more separate components, such as a north bridge and a south bridge, for example. Also, in some embodiments some or all of the functionality of I/O interface 530, such as an interface to system memory 520, can be incorporated directly into processor 510.

Network interface 540 can be configured to allow data to be exchanged between computing device 500 and other devices attached to a network (e.g., network 590), such as one or more external systems or between nodes of computing device 500. In various embodiments, network 590 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 550 can, in some embodiments, include one or more display terminals, keyboards, keypads, touchpads, scanning devices, voice or optical recognition devices, or any other devices suitable for entering or accessing data by one or more computer systems. Multiple input/output devices 550 can be present in computer system or can be distributed on various nodes of computing device 500. In some embodiments, similar input/output devices can be separate from computing device 500 and can interact with one or more nodes of computing device 500 through a wired or wireless connection, such as over network interface 540.

In some embodiments, the illustrated computing device 500 can implement any of the operations and methods described above, such as the methods illustrated by the flowcharts of FIG. 3 and FIG. 4. In other embodiments, different elements and data can be included.

Those skilled in the art will appreciate that computing device 500 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. Computing device 500 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from computing device 500 can be transmitted to computing device 500 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Figure 6:
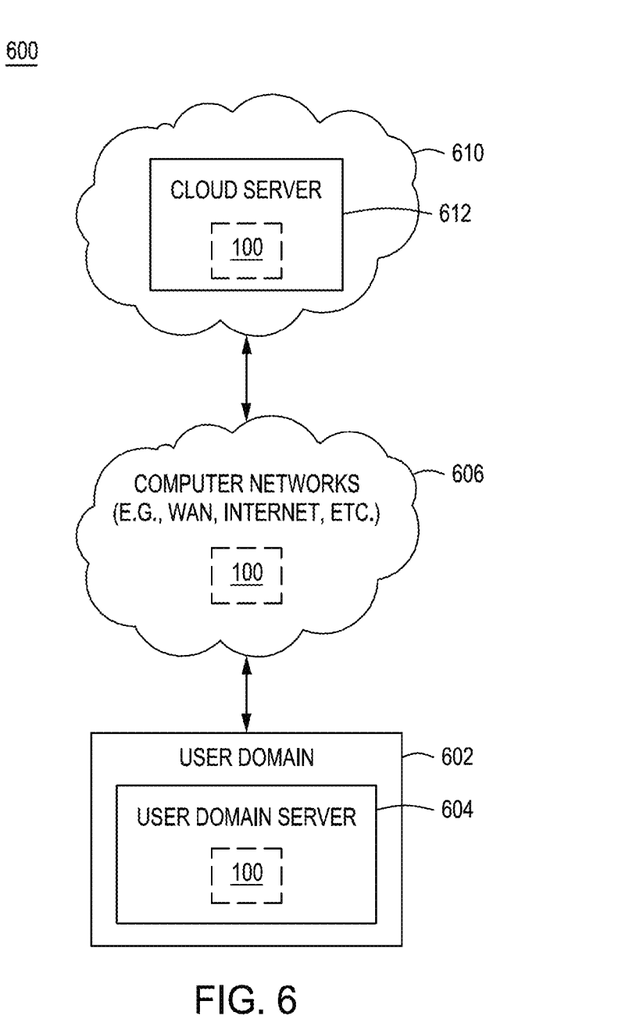
FIG. 6 depicts a high-level block diagram of a network in which embodiments of a visual grounding system in accordance with the present principles can be implemented.

FIG. 6 depicts a high-level block diagram of a network in which embodiments of a visual grounding system in accordance with the present principles can be implemented. The network environment 600 of FIG. 6 illustratively comprises a user domain 602 including a user domain server 604. The network environment 600 of FIG. 6 further comprises computer networks 606, and a cloud environment 610 including a cloud server 612.

In the network environment 600 of FIG. 6, a visual grounding system in accordance with the present principles, such as the visual grounding system 100 of FIG. 1, can be included in at least one of the user domain server 604, the computer networks 606 and the cloud server 612. That is, in some embodiments, a user can use a local server (e.g., the user domain server 604) to provide at least images/data and videos that can be used to train a semantic space in accordance with the present principles. Alternatively or in addition and as described above, a user can provide region proposals (RoIs) for images/videos and parsed phrases for captions, such as query captions.

In some embodiments and as described above, a user can implement a visual grounding system in the computer networks 606 to provide images/data and videos that can be used to train a semantic space in accordance with the present principles. Alternatively or in addition, in some embodiments, a user can implement a visual grounding system in the cloud server 1212 of the cloud environment 610 to provide images/data and videos that can be used to train a semantic space in accordance with the present principles and on which visual grounding is to be performed in accordance with the present principles. For example, in some embodiments it can be advantageous to perform processing functions of the present principles in the cloud environment 610 to take advantage of the processing capabilities of the cloud environment 610. In some embodiments in accordance with the present principles, a visual grounding system can be located in a single or in multiple locations/servers/computers to perform all or portions of the herein described functionalities of a visual grounding system in accordance with the present principles.

In an experimental embodiment, the inventors evaluated a visual grounding system in accordance with the present principles on two tasks—(1) phrase localization, and (2) caption-to-image retrieval (C2I). For the C2I task, results can be reported using standard metrics—(i) Recall@K (R@K) for K=1, 5 and 10 which measures the percentage of captions for which the ground truth image is among the top-K results retrieved, and (ii) median rank of the ground truth image in a sorted list of images retrieved. For phrase localization, the percentage of phrases that are accurately localized with respect to the ground-truth bounding box across all images is reported, where accurate localization means IoU≥0.5. This metric is referred to as phrase localization/detection accuracy (Det:%). Prior works using image-caption supervision for phrase localization perform phrase grounding using attention-based heat maps. Such works use a pointing game-based evaluation metric, which declares success if the center of the visual attention map lies anywhere inside the ground-truth box. A visual grounding system in accordance with the present principles is compared with the prior works by reporting a PointIt % metric where the phrase is considered to be correctly localized if the center of a predicted bounding box lies within the ground-truth box. For C2I retrieval experiments, a visual grounding system in accordance with the present principles was trained and evaluated using both COCO and Flickr30k datasets. For phrase localization, a visual grounding system in accordance with the present principles was evaluated using VG.

In one experiment, region proposals for an image were extracted using Faster-RCNN trained on both objects and attributes from VG. For every image, the top 30 RoIs were selected based on Faster-RCNN's class detection score (after non-maximal suppression and thresholding). RoIAlign was then used to extract features (dv=2048–d) for each of these RoIs using a ResNet-152 model pre-trained on ImageNet.

Shallow parsing was then implemented using the SENNA parser to parse a caption into its constituent phrases. Shallow parsing of sentences first identified the constituent parts of a sentence and then combined them into higher-order structures that had a semantic meaning. Both phrases and sentences were encoded by using a 2-layer, bi-directional GRU with a hidden layer of size 1024 using inputs from 300-dimensional word embeddings (trained from scratch).

In the experiment, the visual grounding system in accordance with the present principles was compared with two baselines approaches. The first baseline, referred to herein as Global, embeds both the image and caption in a joint embedding space and computes a matching score using a similarity function. The first baseline, a pooling-based method, computes similarity between image-caption pairs by summarizing local region-phrase matching scores. In such an experiment, a local matching module in accordance with the present principles is used to infer phrase-region correspondences and then resulting scores were averaged.

At first, entire captions were encoded using a GRU, then the embeddings were computed for each word by using the hidden state at the corresponding word index (within that caption). This approach is referred to as Pooling-based (words). In the experiment, a variant was implemented that used phrases instead of words (Pooling-based (phrases)). For a fair comparison, the same image and text encoders for were used for the baselines as well as for the visual grounding system of the present principles.

In the experiment, different design choices were selected for the local matching and the local aggregator modules of the visual grounding system. For example, for the local matching module, max, topk and attention were implemented as different alternatives for matching phrases with region proposals. Similarly, for the local aggregator module, either an order invariant or dependent (sequence) encoding of the set of matched RoIs were implemented.

In the experiment, all models were trained for 60 epochs with a batch-size of 32 using an Adam optimizer and a learning rate of 0:0002. A margin of 0:1 was used for the triplet-ranking loss in all of the experiments. The final checkpoints were selected on the basis of a model's (best) performance on a small validation set for both localization and C2I tasks.

Figure 7:
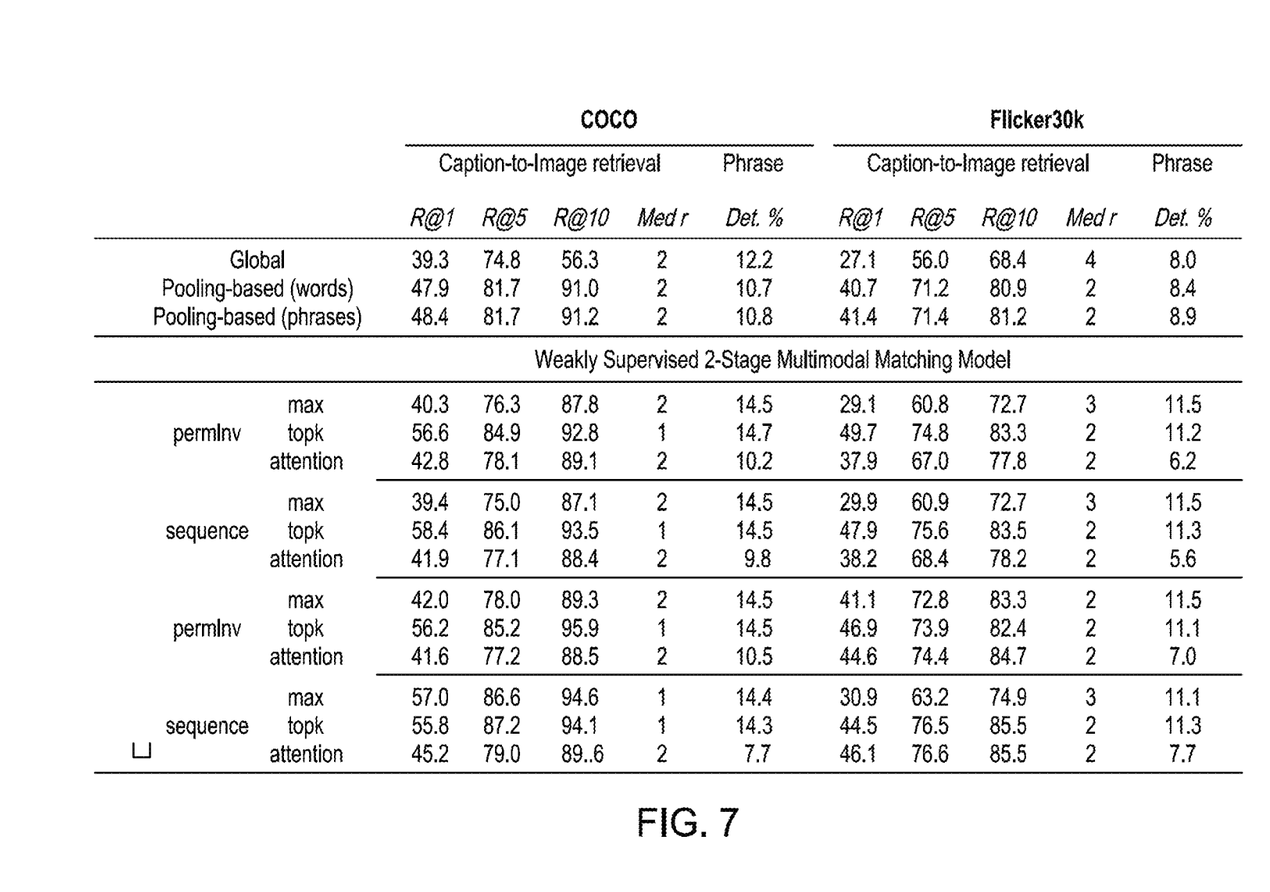
FIG. 7 depicts a Table displaying the quantitative performance of the baselines models as well as the different variants used for the visual grounding system in accordance with embodiments of the present principles.

FIG. 7 depicts a Table displaying the quantitative performance of the baselines models as well as the different variants used for the visual grounding system in accordance with the present principles. Table 1 of FIG. 7 starts by comparing pooling-based methods with global baseline. Table 1 then depicts the impact of the various design choices in the visual grounding system in accordance with the present principles for the phrase localization and C2I tasks. Table 1 reports all results in absolute percentage points. It can be observed from Table 1 that the Pooling-based (phrases)(R@1=48.4) performs better on C2I task than the Global baseline (R@1=39.3) on COCO (with the difference being even higher for Flickr30k). It is also observable from Table 1 of FIG. 7 that the Pooling-based (phrases) outperforms the counterpart-Pooling-based (words) that uses words for matching. Such an outcome confirms the fact that phrases provide a much richer visual description of image regions than words.

An interesting observation from Table 1 is that although the Pooling-based (phrases) method outperforms global baseline in C2I retrieval, the performance of the Pooling-based (phrases) method on phrase localization is not always better than the latter (Det % 10.8 vs. 12.2 for COCO and 8.9 vs. 8.0 for Flickr30k). Such a trend can be explained by the fact that on account of averaging of local matching scores, the Pooling-based methods are able to achieve good results by selectively amplifying correspondences between phrases and image regions (i.e., by assigning high matching scores to visual noun-phrases) without learning to accurately ground all phrases in the caption.

For comparing the performance of the visual grounding system in accordance with the present principles with the baselines methods, the best performing variant of the visual grounding system was selected, (i.e., the model which does local matching using the top-k method, uses a permutation-invariant encoding of the matched Rots, and doesn't include the global RoI in the set encoding (permInv-topk-noGlobal). The permInv-topk-noGlobal model outperformed Global and Pooling-based baselines on all the datasets. Specifically, as observable from Table 1 of FIG. 7, there was an improvement on the phrase localization performance, where the visual grounding system in accordance with the present principles yielded better results than both the Global (by +2.5 on COCO and +3.3 on Flickr30k) and the Pooling-based (phrases) (by +3.9 on COCO and +2.8 on Flickr30k) method.

The improved performance can be attributed to the fact that the architectural design of the visual grounding system in accordance with the present principles primes the supervised loss to be a stronger learning signal for the weakly supervised grounding as compared to Pooling-based baselines. Improvements of 8.2 and 17.3 can also be observed on the C2I task on COCO compared to Global and Pooling-based (phrases) methods respectively. It is also noticeable in Table 1 that the performance of visual grounding system in accordance with the present principles is significantly influenced by the choice of the local matching module. For example, a module implementing topk consistently outperforms a module using max for both the datasets. For example, when using topk for matching phrases with regions (i.e. topk-permInv-noGlobal), an increase (w.r.t. using max-permInv-noGlobal) of 16.3 and 20.6 is observable on R@1 for COCO and Flickr30k respectively. Similar trends are also observed when using the sequence encoder for encoding matched Rots. Using top-k best matching regions leads to diversity, thus preventing the visual grounding system in accordance with the present principles from overfitting during weakly-supervised training.

Using attention for inferring local correspondence tends to help improve the performance at the C2I over using max. Such an improvement, however, can come at the cost of phrase localization performance (14.7 vs. 10.2 for the COCO dataset and 11.2 vs. 6.2 for the Flickr30 dataset).

Figure 8:
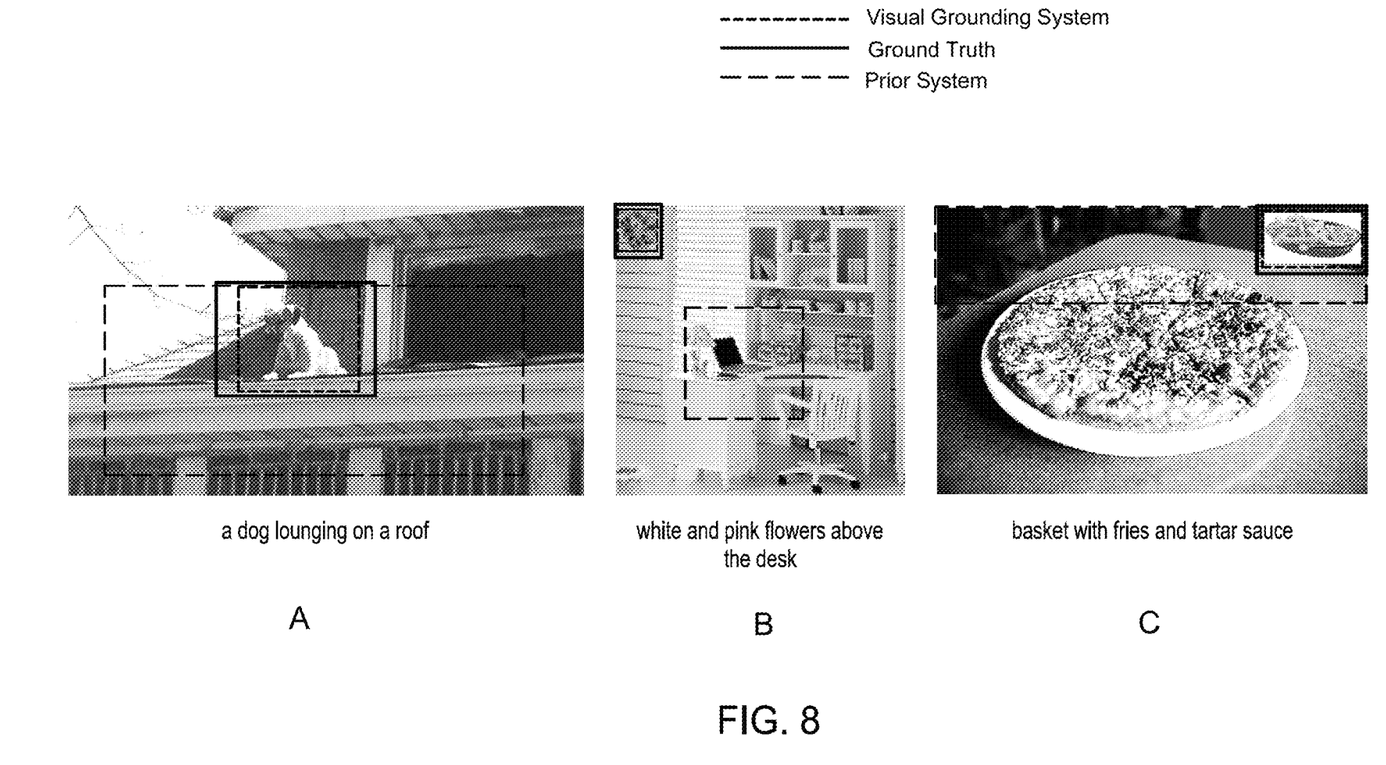
FIG. 8 depicts outputs of a visual grounding system of the present principles and a Pooling-based method for three images (A, B, and C) on the task of phrase localization in accordance with an embodiment of the present principles.

FIG. 8 depicts outputs of a visual grounding system (permInv-topknoGlobal) of the present principles and a Pooling-based method for three images (A, B, and C) on the task of phrase localization on the VG dataset. In the images of FIG. 8 the output of the visual grounding system is depicted as small-dashed bounding box, the output of the Pooling-based method is depicted as a large-dashed bounding box, and the ground truth is depicted as a solid bounding box. In FIG. 8, the visual grounding system of the present principles outperforms the Pooling-based method in grounding noun only phrases, and specifically in grounding the phrase "white and pink flowers above the desk" as depicted in image B of FIG. 8, and in grounding the phrase "basket and fries with tartar sauce" as depicted in image C of FIG. 8. As further depicted in image A of FIG. 8, the visual grounding system of the present principles outperforms the Pooling-based method in grounding phrases with verbs, and specifically in grounding the phrase "a dog lounging on a roof" as depicted in image A of FIG. 8.

Embodiments in accordance with the present principles can be used in many applications including robotics. More specifically, embodiments in accordance with the present principles can be implemented to align to ground phrases used, for example, to command a robot. For example, in some embodiments, a robot can include a large repository of images and embodiments in accordance with the present principles can be used to visually define for the robot images associated with a command phrase. For example, a robot can be commanded to "Pick the red-colored flower on the right". Embodiments in accordance with the present principles can align the command phrase with images stored in association with the robot or other images provided, to visually define for the robot what is a red-colored flower and where is the "right".

Embodiments in accordance with the present principles can be used to search for images in a large repository using phrases. For example, social media images can be retrieved using query phrases.

Embodiments in accordance with the present principles can be used in any application or situation in which there is a need to accurately locate images associated with phrases.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for visual grounding of a caption in an image, the method comprising:
   projecting at least two parsed phrases of the caption into a trained semantic embedding space;
   projecting extracted region proposals of the image into the trained semantic embedding space;
   aligning the extracted region proposals and the at least two parsed phrases;
   aggregating the aligned region proposals and the at least two parsed phrases to determine a caption-conditioned image representation; and
   projecting the caption-conditioned image representation and the caption into a semantic embedding space to align the caption-conditioned image representation and the caption.

2. The method of claim 1, further comprising parsing the caption into the at least two parsed phrases.

3. The method of claim 1, further comprising extracting the region proposals from the image.

4. The method of claim 1, wherein the extracted region proposals and the at least two parsed phrases are aligned by determining a semantic similarity between the projected extracted region proposals and the projected at least two parsed phrases in the trained semantic embedding space.

5. The method of claim 4, wherein the semantic similarity is determined using a distance function.

6. The method of 5, wherein the distance function comprises at least one of a cosine function, a Euclidean function and an L1 function.

7. The method of claim 1, wherein the aligned region proposals and the at least two parsed phrases are aggregated using at least one of a set-encoder, a recurrent neural network (RNN), a convolutional neural network (CNN) and graphs.

8. The method of claim 1, wherein the embedded caption-conditioned image representation and the embedded caption are aligned in the semantic embedding space by computing a distance function between the projected caption-conditioned image representation and the projected caption.

9. The method of claim 1, wherein projecting at least two parsed phrases of the caption into a trained semantic embedding space comprises:
   determining a word vector representation of each of the at least two parsed phrases; and
   projecting the word vector representation of each of the at least two parsed phrases into the trained semantic embedding space such that vector representations that are related are closer together in the trained semantic embedding space than unrelated vectors.

10. The method of claim 1, wherein projecting extracted region proposals of the image into the trained semantic embedding space comprises:
   extracting appearance features of each of each of the extracted region proposals;
   determining a feature vector representation of each of the extracted region proposals; and
   projecting the feature vector representation of each of the extracted region proposals into the trained semantic embedding space such that vector representations that are related are closer together in the trained semantic embedding space than unrelated vectors.

11. The method of claim 10, wherein the semantic embedding space is created using a loss function.

12. An apparatus for visual grounding of a caption in an image, comprising:
a local matching module to:
  project at least two parsed phrases of the caption and extracted region proposals of the image into a trained semantic embedding space; and
  aligning the extracted region proposals and the at least two parsed phrases;
a local aggregator module to aggregate the aligned region proposals and the at least two parsed phrases to determine a caption-conditioned image representation; and
a global matching module to project the caption-conditioned image representation and the caption into a semantic embedding space to align the caption-conditioned image representation and the caption.

13. The apparatus of claim 12, further comprising a parsing module to parse the caption into the at least two parsed phrases.

14. The apparatus of claim 12, further comprising a region proposal module to extract the region proposals from the image.

15. The apparatus of claim 12, wherein the local aggregator module aggregates the aligned region proposals and the at least two parsed phrases using a permutation-invariant set-encoder using a two-layer multilayer perceptron (MLP).

16. The apparatus of claim 12, wherein the global matching module aligns the embedded caption-conditioned image representation and the embedded caption by computing a cosine similarity between the projected caption-conditioned image representation and the projected caption.

17. The apparatus of claim 12, wherein the local matching module projects the at least two parsed phrases of the caption into a trained semantic embedding space by:
  determining a word vector representation of each of the at least two parsed phrases; and
  projecting the word vector representation of each of the at least two parsed phrases into the trained semantic embedding space such that vector representations that are related are closer together in the trained semantic embedding space than unrelated vectors.

18. The apparatus of claim 12, wherein the local matching module projects the extracted region proposals of the image into the trained semantic embedding space by:
  extracting appearance features of each of each of the extracted region proposals;
  determining a feature vector representation of each of the extracted region proposals; and
  projecting the feature vector representation of each of the extracted region proposals into the trained semantic embedding space such that vector representations that are related are closer together in the trained semantic embedding space than unrelated vectors.

19. The apparatus of claim 12, wherein the apparatus is further configured to create a trained semantic embedding space for use for visual grounding of a caption in an image, the creating a trained semantic embedding space comprising:
  for each image region of a plurality of images having known respective phrases, extracting semantic appearance features;
  determining a feature vector representation for the extracted features of each of the image regions;
  determining a word vector representation for the respective phrases of each of the image regions; and
  for each of the image regions, semantically embedding the feature vector representation and the word vector representation for the respective phrases of each of the image regions in a semantic embedding space such that embedded feature vector representations and word vector representations that are related are closer together in the semantic embedding space than unrelated vectors.

* * * * *